United States Patent [19]

Simpson, III

[11] Patent Number: 4,830,831

[45] Date of Patent: May 16, 1989

[54] APPARATUS AND METHOD FOR MANIPULATING AND DISPENSING A FLUID TO A TRAY

[76] Inventor: Leland S. Simpson, III, 4275 N. Chateau, Fresno, Calif. 93711

[21] Appl. No.: 886,054

[22] Filed: Jul. 16, 1986

[51] Int. Cl.⁴ .............................................. A61L 2/18
[52] U.S. Cl. ........................................ 422/28; 34/93; 222/610; 242/86.52; 422/32
[58] Field of Search ............... 34/93, 4; 422/28, 32; 222/610, 192; 242/86.52; 56/328.1, 330; 209/247

[56] References Cited

U.S. PATENT DOCUMENTS

| | | | |
|---|---|---|---|
| 2,869,284 | 1/1959 | Abernathy et al. | 34/93 |
| 3,383,831 | 5/1968 | Goldsmith et al. | 422/28 |
| 3,440,003 | 4/1969 | Tuma | 422/28 |
| 3,587,931 | 6/1971 | Studer | 34/93 |
| 3,623,309 | 11/1971 | Stang et al. | 56/330 |
| 3,751,821 | 8/1973 | Olmo et al. | 34/93 |
| 3,820,300 | 6/1974 | Reinecki et al. | 422/28 |
| 3,974,751 | 8/1976 | Carter et al. | 56/330 |
| 4,221,665 | 9/1980 | Decker | 209/247 |
| 4,532,030 | 7/1985 | Avedian et al. | 209/700 |

Primary Examiner—Barry S. Richman
Assistant Examiner—Timothy M. McMahon
Attorney, Agent, or Firm—Worrel & Worrel

[57] ABSTRACT

An apparatus for use with a tray that has a crop disposed thereon. The apparatus includes a vehicle A-frame attached to an earth traversing vehicle; two adjustment members attached to the vehicle A-frame, each of which is adapted to receive and hold a deployment beam in a fixed attitude; a rotatable roller which is operable to receive and elevate the tray from a point of rest; and a spray manifold operably interconnected with a source of chemical to be applied, which is adapted to apply a chemical solution to the bottom surface of the tray to control the growth of harmful, undesirable organisms.

8 Claims, 2 Drawing Sheets

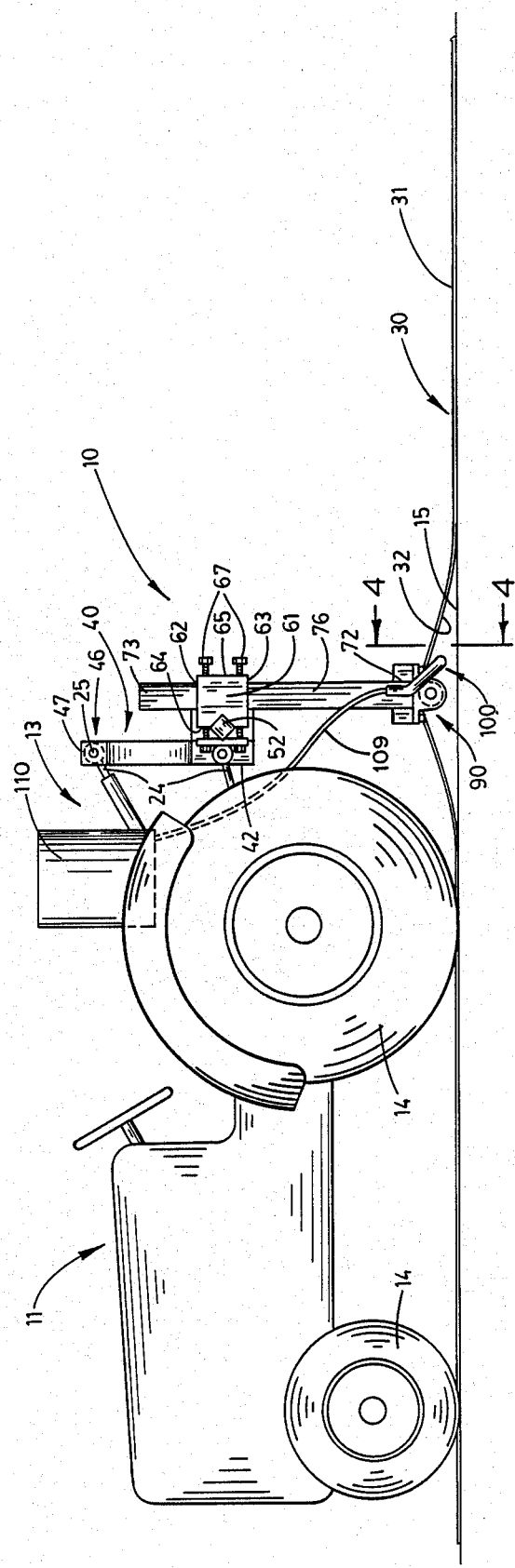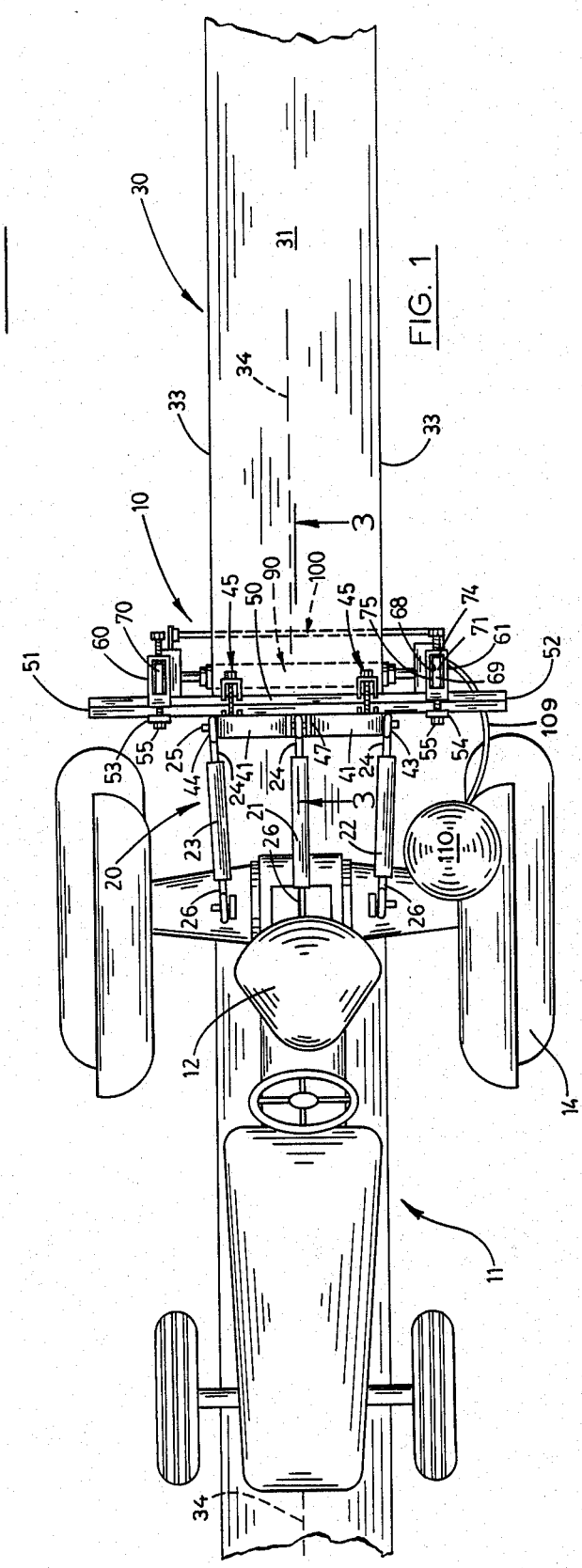

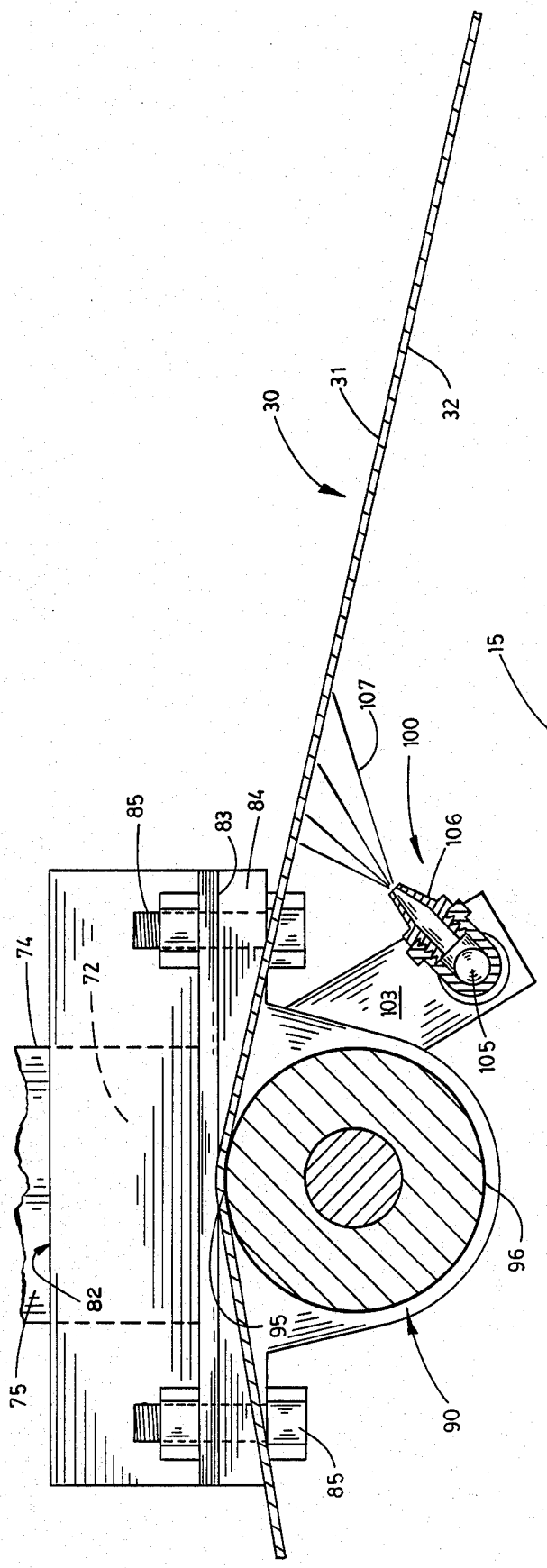
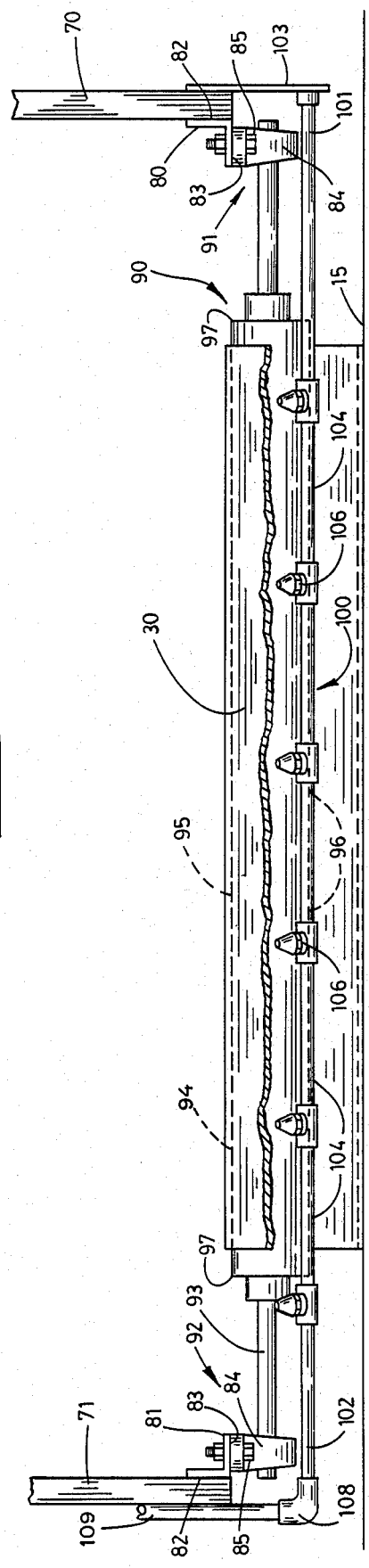
FIG. 3
FIG. 4

4,830,831

APPARATUS AND METHOD FOR MANIPULATING AND DISPENSING A FLUID TO A TRAY

BACKGROUND OF THE INVENTION

1. Field of the Invention

The present invention relates to an apparatus which is mounted on an earth traversing vehicle for the purpose of manipulating a tray which has a crop disposed thereon to overcome the deleterious effects of moisture and, more particularly, to such an apparatus which is also operable to dispense a fluid such as a chemical solution or otherwise, to the bottom surface of a tray for the purpose of inhibiting the growth of undesirable organisms which grow on top of and underneath the tray after the tray and the crop have been exposed to moisture such as rainfall.

2. Description of the Prior Art

The harvesting of agricultural crops, as should be understood, is a labor intensive operation. In particular, it has been noted that some row crops, among the most noteworthy, grapes, present especially difficult harvesting problems for farmers. Grape harvesting is particularly difficult because machines have not been developed to perform all the various tasks which are associated with grape harvesting, whereas other apparatuses have been developed to harvest a wide variety of other row crops.

In the instant case, it should be understood that in the production of raisins from grapes, it has been the customary practice of grape vineyardists to pick the grapes by hand and thereafter spread them on trays arranged in alignment longitudinally of the rows. After the grapes have been placed on the trays, they are left for a period of time to be dried by the rays of the sun to produce raisins. In other instances, the grapes are placed on a single tray extending the full length of each row and allowed to dry.

Although the methods that have been discussed above are in common, widespread usage, they have numerous drawbacks. For example, it is frequently the case that while the grapes are being dried on the trays, the weather in the immediate vicinity becomes inclement and the trays and the grapes being dried thereon are exposed to rainfall. It should be apparent in this situation, that the rainwater collects on and about the trays and also tends to seep underneath the trays. As should be appreciated, the presence of water on and underneath the trays establishes an environment which is conducive to the growth of numerous undesirable organisms, particularly fungi, molds and various microorganisms. If this condition is permitted to exist for a substantial period of time, it has been discovered that these undesirable organisms will destroy a portion of the raisin harvest, thus decreasing the effective yield of the crop.

While it has been known in some instances to move the individual trays out of pools of water or for two people to lift some of the individual trays and to move them a very short distance, without disturbing the crop, from their initial places of rest, insofar as the applicant is aware no prior art method or apparatus has existed for effectively dealing with these problems, whether in the case of individual trays or the long continuous trays.

It is therefore the purpose of the subject invention to provide an apparatus which is easily deployed from an earth traversing vehicle and that is operable to manipulate a tray, and particularly a continuous tray on which a crop rests, in such a manner as to overcome moisture problems caused, for example, by any rainwater which has collected on the top surface of the continuous tray and which is capable of dispensing a chemical solution to the bottom surface of a continuous tray. The apparatus is particularly effective in dissipating the destructive effects caused by the growth of numerous microorganisms, fungi and molds which grow in the advantageous damp environment that remains after a rainfall.

OBJECTS AND SUMMARY OF THE INVENTION

It is therefore an object of the present invention to provide an improved apparatus for manipulating a continuous tray to overcome the effects of moisture such as rain water.

Another object is to provide an apparatus which is operable, substantially, to dissipate the deleterious effects produced by the growth of undesirable organisms in the immediate vicinity of a tray and having particular utility with respect to continuous trays.

Another object is to provide an apparatus which is particularly well suited for installation on a variety of different farm vehicles.

Another object is to provide an apparatus which is operable to dispense a chemical solution or other fluid to the bottom surface of a continuous tray after the tray has been elevated from a position of rest.

Another object is to provide an apparatus which has a spray manifold operable to apply a source of chemicals to substantially the entire bottom surface of the tray after it has been elevated from a position of rest.

Further objects and advantages are to provide improved elements and arrangements thereof in an apparatus for the purposes described which is dependable, economical, durable and fully effective in accomplishing its intended purposes.

These and other objects and advantages are achieved in an apparatus for manipulating a tray and particularly a continuous tray by raising it from ground engagement and which permits the application of a chemical solution or other fluid to the bottom surface of a continuous tray for the purpose of controlling the growth of undesirable microorganisms, wherein adjustment members which mount slidably adjustable deployment beams are positioned on an earth traversing vehicle; a rotatably mounted roller is deployed therebetween the deployment beams; and a spray manifold is mounted in closely adjacent, fixed spaced relation to the roller, operable to apply a source of fluids to substantially the entire bottom surface of the continuous tray.

BRIEF DESCRIPTION OF THE DRAWINGS

FIG. 1 is a top plan view of the apparatus of the subject invention suitably deployed from a common farm tractor.

FIG. 2 is a side elevational view of the apparatus taken along line 3—3 of FIG. 1.

FIG. 3 is a fragmentary, vertical section taken on line 4—4 of FIG. 2.

FIG. 4 is a fragmentary, longitudinal, vertical section taken on line 5—5 of FIG. 1, with several surfaces removed to show the fluid dispensing structure thereunder.

DESCRIPTION OF THE PREFERRED EMBODIMENT

Referring more particularly to the drawings, the apparatus of the present invention is generally indicated by the numeral 10 in FIG. 2. For illustrative convenience only, the apparatus, as shown and described herein, will be discussed as it would be configured if it were installed on a common farm tractor 11. However, it should be understood that the apparatus can be deployed on a wide variety of different vehicles that may have different towing and hitching subassemblies, and which may or may not be self-propelled.

Similarly, the apparatus will be referred to herein as a fluid dispensing apparatus for purposes of illustrative convenience though it will be understood that much of the benefit in the apparatus is achieved by raising the continuous tray without dispensing a suitable fluid to the underside thereof. Thus, the apparatus can operate effectively with or without the fluid dispensing capability.

As will hereinafter be described in greater detail, the dispensing apparatus 10 is adapted for installation on, or fitted to, a farm vehicle, such as a tractor, indicated by the numeral 11 in FIG. 2. As best seen by reference to FIG. 1, the tractor provides an operator position 12. The tractor has a rearward portion 13 and ground-engaging wheels, generally indicated by the numeral 14. As evident in FIG. 2, the ground-engaging wheels are in contact with the surface of the earth or ground 15 as will be subsequently noted.

As best illustrated in FIG. 1, the tractor 11, which propels the dispensing apparatus 10 in earth-traversing movement has, what is commonly referred to in the art, as a three-point hitch; this is generally indicated by the numeral 20. The hitch 20 is composed of a first arm 21, a second arm 22, and a third arm 23. The individual arms have first ends 24. It should be understood that the first ends of the arms have suitable orifices (not shown) which are appropriately dimensioned slidably to receive a pin 25. The individual arms have second ends 26, which are pivotally connected on the rear portion 13 of the tractor in a manner that is familiar to those skilled in the art. It should be understood that the individual arms are moved by the hydraulic system, not shown, of the tractor to raise or lower the dispensing apparatus mounted thereon, on demand, at the selection of the operator.

The dispensing apparatus 10 is adapted for use with a continuous tray, which is generally indicated by the numeral 30 in FIG. 2. The tray 30 has a top surface 31, a correspondingly opposed bottom surface 32, which rests in contact with the surface of the earth 15, peripheral edges 33 and longitudinal axis which is indicated by the line labeled 34. It should be understood that the tray may be manufactured in different sizes, although commonly they are of a standardized length, width and gauge. As previously discussed, the row crop to be harvested is disposed on the top surface of the tray for purposes of drying.

As best seen by reference to FIG. 2, the dispensing apparatus 10 is suitably mounted on a vehicle A-frame, which is indicated generally by the numeral 40. As illustrated by reference to FIG. 1 and FIG. 2, the A-frame 40 has two arms of angulated configuration 41. The A-frame has a base portion 42, which provides attachment points 43 and 44 that are suitably dimensioned to receive, and hold for pivotal movement, the first ends 24 of the arms 22 and 23, respectively. It should be understood that a solid steel bar, not shown, extends between the attachment points 43 and 44, and is firmly affixed to the arms 41 by a suitable weld. Attached to the solid steel bar are several clamps which are indicated by the numeral 45. The A-frame has a central portion 46, which provides a suitable attachment point 47 that receives the first end 24 of the arm 21. This is best illustrated by reference to FIG. 2.

Attached to the A-frame 40 by the clamps 45 is a square steel bar, generally indicated by the numeral 50 in FIG. 1. The square steel bar has a first end 51 and an opposed, second end 52. Closely adjacent and in fixed, spaced relationship from the first end of the square steel bar is a first clamp plate 53. Similarly, in closely adjacent, fixed, spaced relationship to the second end of the square steel bar is a second clamp plate 54. The individual clamp plates are adapted to screw-threadably receive several bolts, which are indicated by the numeral 55.

As can best be appreciated by a study of FIG. 1, the dispensing apparatus 10 has two individual adjustment members, i.e. a first adjustment member 60 and a second adjustment member 61. As illustrated most clearly in FIG. 2, each adjustment member has a first end 62 and an opposed, second end 63. Each adjustment member has a leading surface 64, which is adapted to mate with the square steel bar 50. This configuration permits each adjustment member to be held in a relatively fixed attitude with respect to the A-frame 40. As best illustrated by reference to FIG. 1, the bolts 55 are screw-threadably received into the leading surface 64 and provide the means for attaching each adjustment member to the square steel bar. Each adjustment member has a trailing surface 65, which is adapted to screw-threadably receive suitably dimensioned bolts 67 which are extended therethrough the trailing surface. As should be understood, the individual adjustment members have an inside surface 68 which defines an orifice 69.

As disclosed by a close study of FIG. 2, each adjustment member, 60 and 61, respectively, is adapted, slidably to receive and slectively mount in an adjustable, predetermined attitude, a first and second deployment beam, generally indicated by the numerals 70 and 71 respectively. Each individual deployment beam has a first end 72 and an opposed, second end 73. Each of the beams has a clamp engagement surface 74, an inside surface 75 and an outside surface 76. It should be understood that each of the adjustment members is adapted to clamp the individual deployment beams in a fixed attitude employing the bolts 67. Moreover, it should be recognized that this mechanical arrangement permits the dispensing apparatus 10 to be deployed in a variety of preselected attitudes with respect to the ground 15 over which it travels. This configuration permits the dispensing apparatus to be employed with many different types of farm vehicles that may have widely variable ground clearances, and can, of course, be adjusted for variable topographic conditions.

A first and second angle iron bracket, indicated numerically by the numbers 80 and 81, respectively, are suitably welded to the inside surface 75, about the first end 72 of each deployment beam 70 and 71, respectively. As should be understood, the brackets 80 and 81 have a first surface 82, which is suitably welded to the inside surface 75, and a bottom surface 83, which receives a bearing housing, generally indicated by the numeral 84 in FIG. 3. As best illustrated in that figure, appropriately dimensioned bolts 85, screw-threadably extend therethrough the bottom surface of the bracket to attach the bearing housing to the bracket.

Mounted between each deployment beam 70 and 71, respectively, is a rotatable roller, which is generally indicated by the numeral 90 in FIG. 4. As should be understood, the roller 90 has a first end 91 and an opposed, second end 92, which are each received in the bearing housings 84, respectively. The roller has an axle 93 and a tray engagement surface, generally indicated by the numeral 94. The roller has a top portion 95 and an opposed, bottom portion 96. As best illustrated by reference to FIG. 4, the roller is shown as somewhat wider than the continuous tray 30 which it is adapted to receive. The peripheral edges of roller 90 are indicated by numeral 97 in FIG. 4. It should be understood, however, that the roller which is utilized should, ideally, have a longitudinal measurement that is substantially equal, but not less than, the width dimension of the tray 30.

As best illustrated by reference to FIG. 3, the top portion 95 of the roller 90 is adapted to receive and elevate the tray 30 a predetermined distance from its original point of rest; the tray, as earlier discussed, having been laid on the surface of the earth 15. The elevation of the tray over the top portion of the roller, it should be understood, has the effect of breaking any adhesion between the tray and the ground, of dissipating small pools of water which have collected on the top of the tray after a rainfall and further has the effect of creating a moving pocket beneath and along the tray. Moreover, the action of elevating the tray permits the crop which is disposed the top surface 31 thereof to move somewhat slightly, relative to the top surface of the tray, thus causing the crop to break any points of adhesion that it may have developed with the top surface caused by the presence of the rainwater. It has been discovered that the slight movement of the crop has the effect of decreasing the amount of mold which would normally grow in the area of contact which exists between the row crop and the top surface of the tray. These effects in themselves have great benefit in overcoming the potential deleterious effects of the moisture.

Mounted between each of the deployment beams 70 and 71, respectively, and in closely adjacent, fixed spaced relationship to the roller 90 is a spray manifold, generally indicated by the numeral 100. As best understood by reference to FIG. 4, the spray manifold has a sealed first end 101 and an opposed, second end 102. A mounting bracket 103 is affixed to the outside surface 76 of the first deployment beam 70, and is adapted to receive and hold the first end 101 of the spray manifold in a predetermined attitude The spray manifold is preferably manufactured of a substantially rigid conduit 104. As can best be appreciated by reference to FIG. 3, the conduit 104 has a suitably dimensioned internal orifice 105.

Affixed in predetermined spaced relationship along the length of the conduit 104 are appropriately dimensioned, screw-threadable spray nozzles 106 which are attached in fluid-flow communication with the internal orifice 105. As best understood by reference to FIG. 3, the spray nozzles are adapted to dispense a fluid whether it be solution mist, suspension or other flowable material, generally indicated by the numeral 107, to the bottom surface 32 of the tray 30. As is clearly illustrated by reference to FIG. 4, the spray nozzles are mounted in such a fashion along the length of conduit such that they dispense or apply the solution mist to substantially the entire bottom surface of the tray.

It should be understood that the solution mist 107 may be of a type which will control, or competely eliminate the growth of selected undesirable organisms that are injurious to the row crop that is being harvested. Mounted in close proximity to the second end 102 of the spray manifold 100 is an elbow joint 108. A conduit 109 extends from the second end of the spray manifold and is appropriately attached to a tank 110 which dispenses a solution which is not shown but which is thereafter converted to solution mist 107 by the action of the spray nozzles 106.

OPERATION

The operation of the described embodiment of the subject invention is believed to be clearly apparent and is briefly summarized at this point.

The operation of the apparatus 10 is described herein as it would occur if such an apparatus had been installed on an earth traversing vehicle, such as a tractor 11 or the like.

To properly employ and utilize the dispensing apparatus 10 for the purpose of controlling the growth of undesirable microorganisms, fungi and molds, requires that the appratus be deployed and propelled by an earth traversing vehicle, such as a tractor 11, which is individual thereto. The operator, which is not shown, would, prior to utilizing the apparatus, adjust each deployment beam, indicated numerically by the numbers 70 and 71, respectively.

Each deployment beam is adjusted in a similr select attitude based upon a number of different factors, such as the topography over which the dispensing apparatus 10 will be operating, and the overall effect which is desired. For example, it should be understood that the dispensing apparatus should ideally be deployed approximately four to six inches above the surface of the earth 15. Those skilled in the art will recognize that the hitch system 30 can be employed to adjust the dispensing apparatus in the desired attitude. However, depending upon the model tractor 11 utilized and various other factors, the hitch system may not be adequate and therefore the deployment beams would be adjusted appropriately. After properly adjusting each deployment beam 70 and 71, the operator will thereafter feed the tray 30 over the roller 90.

Following the step of feeding the tray 30 over the top portion 95 of the roller 90, the operator mounts the tractor 11 at the operator's position 12, and thereafter drives in a path of travel that is substantially aligned with or parallel to the longitudinal axis 34 of the tray 30. This is best understood by reference to FIG. 1. As the tractor moves in a substantially parallel path of travel, the apparatus 10 causes the tray to be elevated over the top portion of the roller. The elevation of the tray is operable to break any adhesion between the ground and the tray and to cause water that has collected on the top surface 31 of the tray to be dissipated. Moreover, the row crop which is disposed on the top surface of the tray is permitted to move somewhat slightly relative to the top surface, thus breaking any points of adhesion or any water seal that may have developed between the row crop and the tray. This movement effectively inhibits the growth of microorganisms and other undesirable organisms in the area of contact, because the advantageous damp environment which encourages their growth is substantially eliminated by this slight movement.

In the preferred embodiment, as the tray 30 is elevated over the top portion 95 of the roller 90, a spray manifold 100, which mounts a plenary number of spray nozzles 106 sprays a solution mist 107 onto the bottom surface 32 of the tray. As best understood by reference to FIG. 2, the spray manifold is operably interconnected with a source of fluid stored in a fluid tank 110 by a conduit 109 which extends from the second end of the spray manifold and connects in fluid transferring relation to the tank 110 and a pump means, not shown, which develops pressure. It should be appreciated that the spray nozzles are mounted in substantially fixed, spaced relationship and in a predetermined attitude which permits the solution to be applied to substantally the entire bottom surface 32 of the tray. Those skilled in the art should recognize that various combinations of solution mists 107 can be applied to the bottom surface to control any number of selected undesirable organisms. The tray, in any case, is coated with the solution so as to control such organisms on both the top and bottom of the tray.

Thus, the present invention relates to an apparatus for manipulating and for treating, with a fluid chemical solution, a downwardly disposed surface 32 of an elongated tray 30 or the like disposed on the ground and having fruit, not shown, on the upwardly disposed surface. The tractor 11, during operation, is driven along the tray in a direction substantially aligned with the longitudinal axis 34 thereof. A substantially horizontal roller 90 is mounted for rotation on the vehicle 11 in upwardly spaced relation to the ground and transversely of the tray 30. As best shown in FIG. 3, the tray 30 is guided upwardly over the roller 90 and thence downwardly to the surface of the ground forming a pocket below the tray adjacent to the ground as the vehicle moves therealong. As shown, plurality of nozzles 106 working in combination with the tank 110 applies a source of fluid chemical or other treating fluid under pressure to the entire downwardly disposed surfaced of the tray to inhibit the growth of undesirable organisms growing in the immediate vicinity thereof.

Although the invention has been herein shown and described in what is conceived to be the most practical and preferred method and embodiment, it is recognized that departures may be made therefrom within the scope of the invention, which is not to be limited to the illustrative details disclosed.

Having described my invention, what I claim as new and desire to secure by Letters Patent is:

1. A method for reducing the deleterious effects of moisture upon a crop borne by an elongated tray wherein the tray has a lower surface adapted to be rested on the earth's surface with said crop disposed on an upper surface thereof, the method comprising:

feeding the tray over a supporting surface at a starting point relative to the tray elevated above the earth's surface;

moving the supporting surface in earth traversing movement from the starting point along the tray to create a moving pocket between the tray and the earth's surface whereby the tray and the crop borne thereby are disturbed to reduce the deleterious effects of moisture; and dispensing a solution to said lower surface of the tray in said moving pocket further to reduce the deleterious effects of moisture.

2. An apparatus for manipulating a tray and the tray therefor comprising:

an elongated tray having opposite top and bottom surfaces and a longitudinal axis constructed and arranged to be rested on the earth's surface with the bottom surface of the tray in engagement with the earth's surface and the top surface facing substantially upwardly;

a frame;

means for moving the frame along the tray, when said tray is disposed in rested relation on the earth's surface, above the earth's surface along a course substantially parallel to the longitudinal axis of the tray;

means borne by the frame constructed and arranged for elevating said tray from the earth's surface and then returning the tray to rested position on the earth's surface during said moving; and means borne by said moving means or said frame for spraying a fluid on the bottom surface of said tray to control the growth of undesirable organisms thereon upon said elevating of the tray.

3. The apparatus of claim 2 wherein said elevating means is a roller mounted on said frame for rotational movement about a substantially horizontal axis and adapted to receive the tray in supported relation thereon to create a pocket which is defined between the bottom surface of the tray and the earth's surface.

4. The apparatus of claim 3 wherein the means for spraying the fluid on the bottom surface of the tray is a spray manifold mounted on the apparatus beneath the tray in said pocket in fluid transferring relation to the bottom surface of the tray, said spray manifold having a plurality of spray nozzles for dispensing the fluid onto substantially the entire bottom surface of the tray.

5. An apparatus for manipulating a tray and the tray therefor comprising:

A. an elongated tray elongated along a longitudinal axis having a top surface on which a crop is adapted to be disposed and a bottom surface for resting on the earth's surface;

B. a frame;

C. means for moving the frame along the tray, when said tray is disposed in rested relation on the earth's surface, above the earth's surface along a course substantially parallel to the longitudinal axis of the tray;

D. a source of treating fluid borne by said moving means;

E. a roller rotationally mounted on the frame and constructed and arranged to receive in supported relation thereon and elevate the tray during said moving so as to create a pocket disposed between the earth's surface and the bottom surface of the tray;

F. a spray manifold connected in fluid receiving relation to said source of treating fluid constructed and arranged to dispense the treating fluid therefrom; and G. means for mounting the spray manifold on the frame closely adjacent to the earth's surface to dispense the treating fluid onto the bottom surface of the tray within said pocket formed as the tray is received and elevated by said roller.

6. The apparatus of claim 5 wherein the frame has first and second adjustment members slidably mounting first and second deployment beams, said first and second adjustment members including means for maintaining said first and second deployment beams in corresponding preselected attitudes above the earth's surface.

7. The apparatus of claim 6 wherein the tray has a transverse dimension and said roller is mounted on and extends between the first and second deployment beams and has a longitudinal dimension at least as long as the transverse dimension of said tray.

8. The apparatus of claim 7 wherein the spray manifold mounts a plurality of spray nozzles operable to dispense said treating fluid to substantially the entire bottom surface of said tray.

* * * * *